United States Patent [19]
Nobuchi

[11] Patent Number: 5,873,554
[45] Date of Patent: Feb. 23, 1999

[54] INFORMATION PROCESSOR

[75] Inventor: Atsunobu Nobuchi, Kanagawa, Japan

[73] Assignee: Fujitsu Limited, Kawasaki, Japan

[21] Appl. No.: 774,330

[22] Filed: Dec. 27, 1996

[30] Foreign Application Priority Data

Jan. 8, 1996 [JP] Japan .................................. 8-000943

[51] Int. Cl.⁶ .................................................. G06F 1/16
[52] U.S. Cl. ...................... 248/278.1; 248/921; 248/923; 361/681
[58] Field of Search ................ 248/278.1, 917, 248/921–923; 361/681; 364/708.1

[56] References Cited

U.S. PATENT DOCUMENTS

| | | | |
|---|---|---|---|
| 5,016,849 | 5/1991 | Wu | 361/681 X |
| 5,034,858 | 7/1991 | Kawamoto | 364/708.1 X |
| 5,168,423 | 12/1992 | Ohgami et al. | 248/921 X |
| 5,335,142 | 8/1994 | Anderson | 361/681 |

FOREIGN PATENT DOCUMENTS

| | | | |
|---|---|---|---|
| 3235457 | 3/1984 | Germany | 361/681 |
| 5-289774 | 11/1983 | Japan . | |
| 3-109621 | 5/1991 | Japan . | |
| 4-188214 | 7/1992 | Japan . | |
| 4-218820 | 8/1992 | Japan . | |
| 5-11885 | 1/1993 | Japan | 361/681 |
| 5-165546 | 7/1993 | Japan . | |
| 5-173668 | 7/1993 | Japan . | |
| 5-242040 | 9/1993 | Japan . | |
| 6-161599 | 6/1994 | Japan . | |
| 6-230852 | 8/1994 | Japan . | |
| 6-324759 | 11/1994 | Japan . | |
| 6-332570 | 12/1994 | Japan . | |
| 7-160364 | 6/1995 | Japan . | |
| 8-129435 | 5/1996 | Japan . | |
| 9300170 | 1/1993 | WIPO | 361/681 |

*Primary Examiner*—Peter R. Brown
*Attorney, Agent, or Firm*—Staas & Halsey

[57] ABSTRACT

An information processor which is capable of preventing damages caused by rotation of a display panel holding unit to a display and a body of the information processor. A rotary shaft member is connected to a display panel holding unit and directed perpendicularly, an outer end of a lock bar is inserted into a lock hole of the body unit and an inner end thereof is removed from a lock hole of the rotary shaft member. A connection member is therefore unable to rotate with respect to the body unit and the rotary shaft member gets rotatable with respect to the connection member. When the rotary shaft member is tilted away from the perpendicular direction, the outer end of the lock bar comes off the lock hole of the body unit and the inner end thereof is inserted into the lock hole of the rotary shaft member. The rotary shaft member is therefore unable to rotate with respect to the connection member and the connection member is rotatable with respect to the body unit.

5 Claims, 8 Drawing Sheets

INFORMATION PROCESSOR

BACKGROUND OF THE INVENTION

1. Field of the Invention

The present invention relates to an information processor including a display unit openable and closable with respect to its body.

2. Description of the Prior Art

Figure 14:
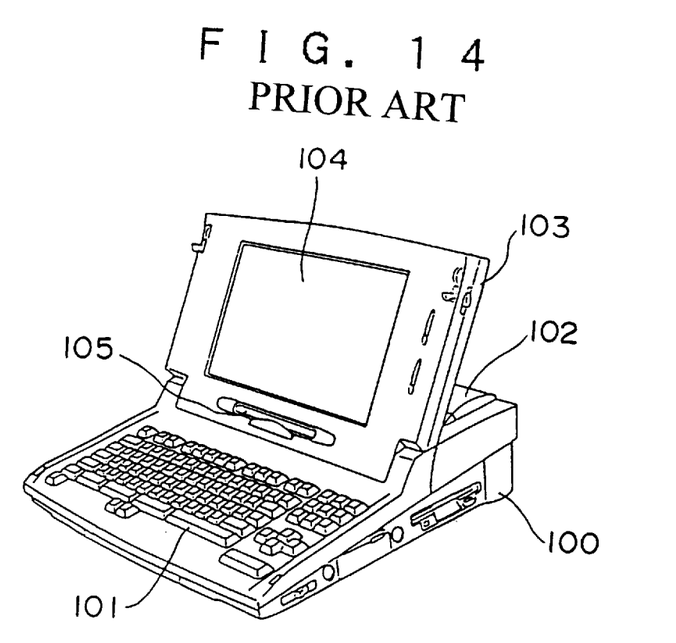
FIG. 14 is a perspective view illustrating a prior art personal computer.

An information processor, such as a personal computer and a word processor, that is classified as a so-called lap top or notebook type is, as illustrated in FIG. 14, constructed of a body unit 100 equipped with a keyboard 101, a printer 102, and a display unit 103 equipped with a display 104, such as a liquid crystal display or a plasma display. This display unit 103 serves as a cover for the keyboard 101 and is therefore connected to the body unit 100 so that the display 104 pivots between a position where the display 104 is closed in a face-to-face relationship with the keyboard 101 and a position of such an angle that the display 104 is visible to the operator.

In recent years, for the purpose of facilitating input operations, there has been utilized an information processor capable of inputting handwritten characters and images with an input pen and also moving a cursor by providing, on a display 104, a resistance film screen formed by piling transparent electrodes, etc. Thus, among the input operations involving the use of a keyboard 101, comparatively easy input operations can be done by handwriting with the input pen 105 and providing a resistance film screen on the display 104. Therefore, a variety of proposals have thus been made for enhancing the operability in terms of the handwriting input instead of inputting by the keyboard 101. One example of such a proposal is where a display unit 103 is separated into a connection unit connected directly to a body unit 100 and a display holding unit, wherein the display holding unit is rotatably connected to the connection unit through a second axle (also referred to as an axis) extending in a direction orthogonal to a first axle for making the connection unit rotatably connective to the body unit 100. If such a construction is adopted, the display holding unit of the display unit 103 is rotated through 180 degrees, and, in this state, the whole display unit 103 can cover the keyboard 101. With this arrangement, the keyboard 101 is covered with the display unit 103, while the display 104 appears outside while being set in the direction of its planar surface. Accordingly, the operator is able to perform the handwriting inputs as easily as writing a letter or a drawing on a notebook and is able to see the output result from a printer while performing the handwriting.

A further proposal in terms of constructing the normal information processor, without a resistance film screen on the display 104, is that the display holding unit can be turned over to present the information displayed on the display to those other than the operator.

According to the above described constructions, however, the first and second axles rotate individually independently. Hence, there is no restriction in terms of an angular position of the whole display unit 103 with respect to the body unit 100 when the display holding unit is rotated (through 180 degrees) about the second axle. In consequence, the display holding unit is still rotatable even when the whole display unit 103 is in angular positions, exclusive of such an angular position as to be upright with respect to the body unit 100. However, when the display holding unit is rotated in these angular positions, it follows that the display holding unit impinges upon the body unit 100 (the keyboard 101 or the printer 102), with the result that these units may be damaged.

SUMMARY OF THE INVENTION

It is a primary object of the present invention to provide an information processor capable of making a display holding unit constituting a display unit rotatable with respect to a connection unit only in such an angular position that a whole display unit is substantially upright with respect to a whole body unit of the information processor, thereby preventing damage to a display itself and the body of the information processor which are caused due to a rotation of the display holding unit.

To accomplish the above object, according to one aspect of the present invention, an information processor for displaying results of information processing on a display comprises a body unit having an upper surface and a connection unit provided rotatably with respect to the body unit by a first axle disposed substantially in parallel to the upper surface of the body unit. The information processor also comprises a display unit, provided with respect to the connection unit by a second axle disposed in a direction orthogonal to the first axle. The body unit has the display on a planar surface thereof, and a rotation restricting member for, only when said display unit is in a first angular position in which said display unit is substantially upright on upper surface of said body unit, restricting a rotation of the connection unit with respect to the body unit and allowing said display unit to rotate with respect to said connection unit. When the display unit is in a second angular position exclusive of the first angular position, the rotation restricting member releases the body unit from the rotational restriction of the connection unit while restricting the rotation of the display unit with respect to the connection unit.

In the information processor according to the present invention, the rotation restricting member releases the body unit from the rotational restriction of the connection member when the display unit is in the second angular position but restricts the rotation of the display unit with respect to the connection member. Accordingly, the display unit rotates about the first axle so as to be openable and closable with respect to the body unit. On this occasion, however, it does not happen that the display unit rotates about the second axle, and therefore the display unit is prevented from being damaged because of an impingement upon the body unit. On the other hand, the rotation restricting member is capable of, when the display unit is in such a first angular position as to be substantially upright on the upper surface of the body unit, restricting the rotation of the connection member with respect to the body unit but releasing the connection unit from the rotational restriction of the display unit. Accordingly, in this case, there is no possibility of damages due to the impingement upon the body unit and the display unit can be rotationally turned over.

Herein, the information processor may include electronic computers such as a personal computer, a word processor, etc. and, in addition thereto, all kinds of devices for indicating data on indicators such as an electronic notebook, a watch, etc..

The display may include a cathode ray tube and an electro luminescence display in addition to a liquid crystal display and a plasma display. A handwriting input device such as a resistance film screen may be provided on the display.

The upper surface of the body unit connotes a surface disposed upward in a normal using state. Hence, this upper surface is neither necessarily directed in the horizontal direction nor a planar surface.

The first angular position wherein the display unit is substantially upright on the upper surface of the body unit is, in view of the fact that the upper surface is not necessarily directed in the horizontal direction, not strictly required to be perpendicular. That is, leastwise if the display unit is rotated about the second axle in an angular position with respect to the connection unit and this angular range does not impinge upon the body unit, the first angular position may embrace this position.

The rotation restricting member of the information processor according to the present invention may be provided within the connection unit. The rotation restricting member may be movable between a first position locatable only when the display unit is in the first angular position with respect to the upper surface of the body unit and a second position locatable irrespective of the angular position of the display unit with respect to the upper surface of the body unit, said rotation restricting member engaging with the body unit and disengaging from the display unit when in the first position, said rotation restricting member engaging with the display unit and disengaging from the body unit when in the second position.

Further, the rotation restricting member of the information processor may include an operating portion operable from outside of the connection unit.

Also, in the information processor according to the present invention, the rotation restricting member may include bars at both ends thereof. The body unit may be formed with a recess engaged with a bar at one end of the rotation restricting member only when the rotation restricting member is in the first position. The display unit may also be formed with a recess engaged with a bar at the other end of the rotation restricting member only when the rotation restricting member is in the second position.

Moreover, the information processor according to the present invention may be constructed so that the bars of the rotation restricting member are coaxial.

Furthermore, the information processor according to the present invention may be constructed so that axial directions of the bars of the rotation restricting member are orthogonal to each other.

Based on the information processor of the present invention, the display unit becomes rotatable with respect to the connection unit only when the whole display unit is in such an angular position as to be substantially upright with respect to the entire body unit, thereby making it possible to prevent damages to the display itself as well as to the body of the information processor due to the rotation of the display unit.

BRIEF DESCRIPTION OF THE DRAWINGS

Other objects and advantages of the present invention will become apparent during the following discussion in conjunction with the accompanying drawings, in which.

DETAILED DESCRIPTION OF THE PREFERRED EMBODIMENTS

Specific embodiments of an information processor according to the present invention will hereinafter be described with reference to the drawings.

Figure 1:
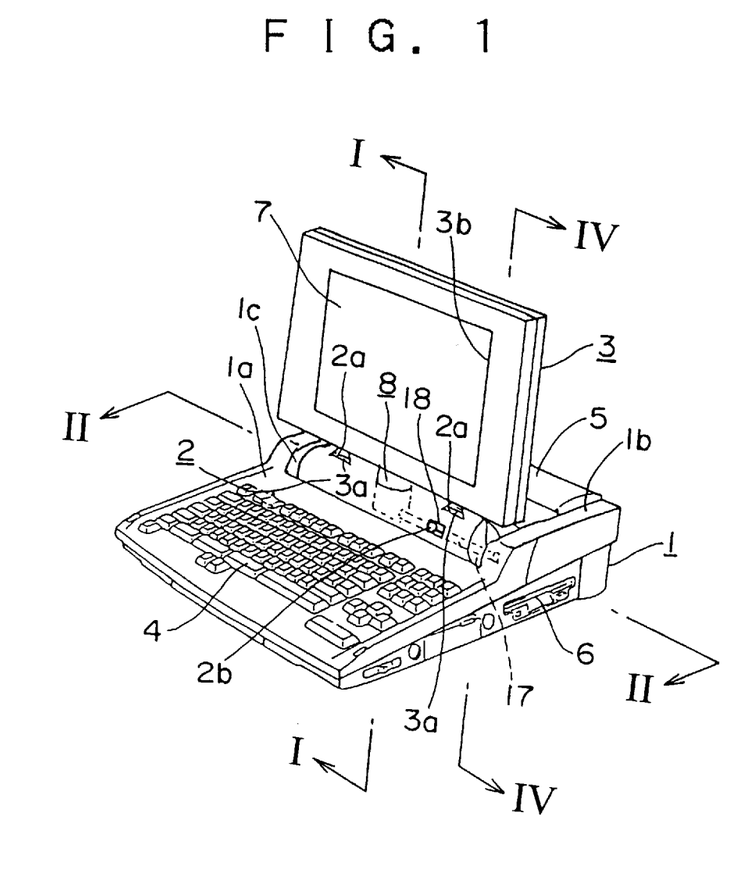
FIG. 1 is a perspective view illustrating a personal computer by way of a first embodiment of an information processor according to the present invention.

FIG. 1 is a perspective view showing an appearance of a personal computer defined as a mode of an embodiment of an information processor according to the present invention.

Referring to FIG. 1, the personal computer comprises principally a body unit 1, an intermediate unit 2 and a display unit 3.

The body unit 1 is a unit incorporating an information processing circuit (unillustrated) of a CPU (Central Processing Unit) or the like for executing information processing based on inputted data. The body unit 1 has a box-like configuration that a widest surface thereof is directed upward in a normal using state (where the body unit 1 is placed in a direction shown in FIG. 1). The upper surface thereof is, however, formed with such a stepped portion that a closer-to-operator portion (hereinafter termed a "proximal portion") 1a is comparatively low, while a farther-from-operator portion (hereinafter termed a "distal portion") 1b is comparatively high. A keyboard 4 for inputting the data to the information processing circuit is provided on this proximal portion 1a on the upper surface, while a printer 5 for printing the data outputted from the information processing circuit is provided in the distal portion 1b on the upper surface. An elongated recessed portion 1c is formed, in parallel to a boundary line between the proximal portion 1a and the distal portion 1b on the upper surface, in a contiguous area of the distal portion 1b to the proximal portion 1a on the upper surface. Note that a side surface of the body unit 1 is formed with a slot 6 which a floppy disk for storing the data, is ejected from and inserted into.

The intermediate unit 2 is provided so as to be rotatable about a first axle L1 (see FIG. 3) paralleled to the boundary line between the proximal portion 1a and the distal portion 1b on the upper surface. This intermediate unit 2 assumes substantially a cylindrical configuration coaxial with the axle L1. Then, the intermediate unit 2 is completely fitted into the recessed portion 1c of the body unit 1 so that a highest point of the peripheral surface thereof has the same height as the distal portion 1b on the upper surface of the body unit 1, and the proximal portion of the peripheral surface is in the same position as the boundary line between the proximal portion 1a and the distal portion 1b on the upper surface of the body unit 1.

A display unit 3 is provided so as to be rotatable about a second axle L2 (see FIGS. 2 and 3) extending in directions orthogonal to the first axle L1 on the peripheral surface of the intermediate unit 2. This display unit 3 takes a plate-like configuration in a planar rectangular shape, and a rectangular display window 3b is formed on one planar surface. Provided in this display window 3b is a liquid crystal display (LCD) 9 (see FIG. 2) for displaying data outputted from the information processing circuit incorporated in the body unit 1. Further, a transparent resistance film screen 7, serving as a protection plate for the liquid crystal display 9, is inset in the display window 3b. This resistance film screen 7 is constructed by laminating two sheets of transparent resinous plates formed with striped transparent electrodes in such directions that these transparent electrodes intersect each other in their longitudinal directions. With this arrangement, upon a depression by a tip of a pen from outside, an electric current running across each transparent electrode therein changes. Accordingly, a contact position of the pen can be specified based on a state of the current across each of the transparent electrodes. Thus, specified positional data (positional shift data) of the depressed portion are inputted as handwriting input data to the information processing circuit in the body unit 1.

Next, the connecting structure between the body unit 1, the intermediate unit 2 and the display unit 3 will be explained in much greater detail.

Figure 2:
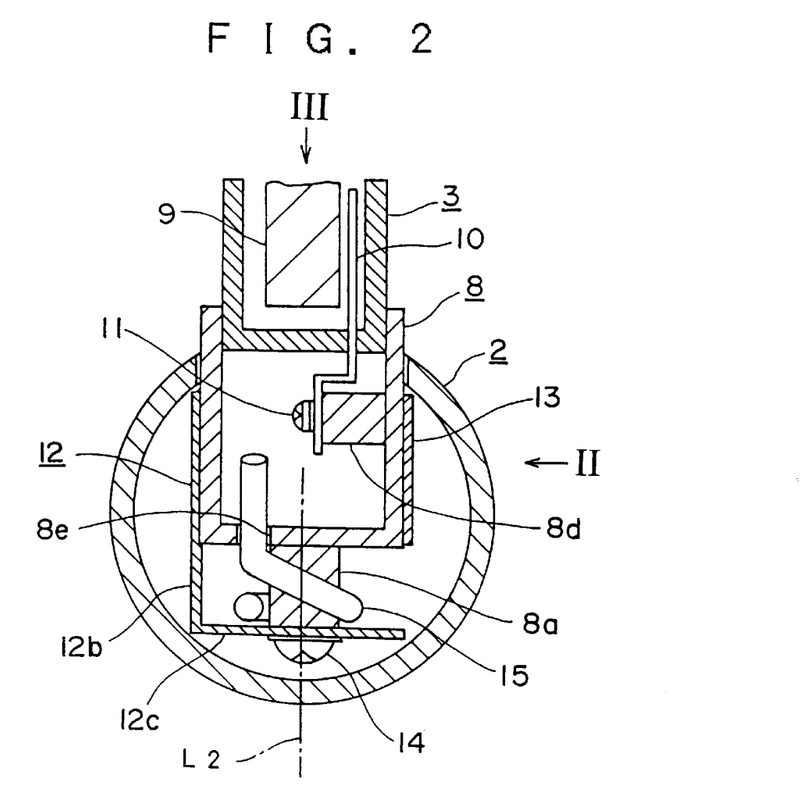
FIG. 2 is a partial enlarged vertical sectional view taken along the line I—I in FIG. 1.
Figure 3:
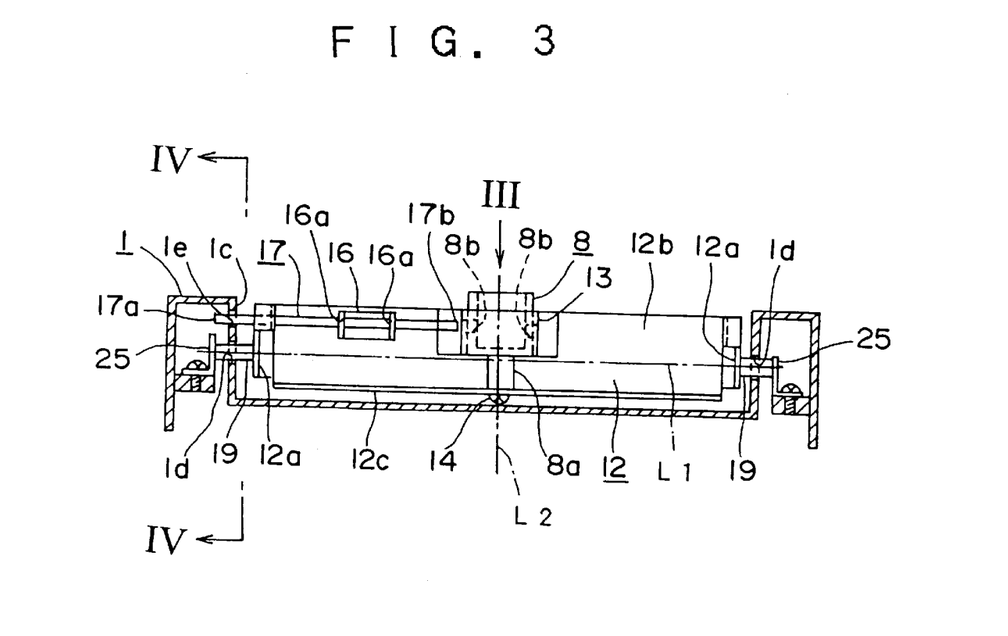
FIG. 3 is a partial enlarged vertical sectional view taken along the line II—II in FIG. 1.

FIG. 2 is a partially enlarged vertical sectional view taken along the line III in FIG. 1, wherein the illustration of the body unit 1 is omitted. Further, FIG. 3 is a partially enlarged vertical sectional view, wherein the illustration of the intermediate unit 2 is omitted.

As shown in FIGS. 1 and 2, one end of a cylindrical rotary shaft member 8 is fixed, in parallel to end-axial directions of the front of the display unit 3, to the center of a lower end surface of the display unit 3 in the normal using state (shown in FIG. 1). A protrusion 8d directed to the central shaft is integrally formed on an inner peripheral surface of the rotary shaft member 8. An edge of a reinforcing fitting 10 secured inside the display unit 3 is fastened and fixed to the protrusion 8d with a screw 11. Consequently, this rotary shaft member 8 is firmly fixed to the display unit 3. Further, the other end of the rotary shaft member 8 is closed by a bottom surface. A shaft protrusion 8a coaxial with the rotary shaft member 8 is protruded outward from the center of the bottom surface.

Figure 4:
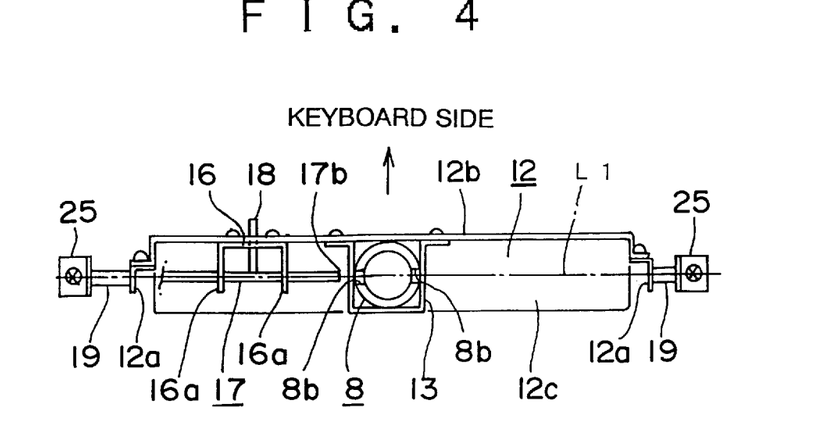
FIG. 4 is a view showing parts as viewed in an arrowed direction III in FIG. 3.

On the other hand, an elongated connection fitting 12 assuming an L-shape is provided along the axial direction of the intermediate unit 2 and within the intermediate unit 2. FIG. 4 is a view of parts but shows the connection fitting 12 in a state as viewed in an arrowed direction A in FIGS. 2 and 3. As illustrated in FIGS. 2 through 4, the principal portion of the connection fitting 12 is bent in the L-shape at 90 degrees and is thereby separated into a first piece 12b having a comparatively large width and a second piece 12c having a comparatively small width. The shaft protrusion 8a of the rotary shaft member 8 is rotatably fixed to an inner surface of the second piece 12c of the connection fitting 12 with a screw 14 in a state where a peripheral surface of the rotary shaft member 8 is contiguous to an inner surface of the first piece 12b of the connection fitting 12, and where the central axle of the rotary shaft 8 intersects the central axle of the intermediate unit 2. Then, a bearing 13 (see FIG. 4,) taking substantially a C-shape as viewed from the display unit 3, is fixed with a screw to the inner surface of the first piece 12b of the connection fitting 12 so that the shaft protrusion 8a and the rotary axle of the rotary shaft member 8 are always directed perpendicular to the second piece 12c of the connection fitting 12. A housing space having substantially the same size as a major diameter of the rotary shaft member 8 is defined by respective sides of the inner surface of the bearing 12 in combination with the inner surface of the first piece 12b of the connection fitting 12. The rotary shaft member 8 housed in the housing space is thereby prevented from being inclined.

With this construction, it follows that the display unit 3 rotates about the axle of the rotary shaft member 8 with respect to the connection member 12. That is, the connection member 12 functions as a connecting piece, and the rotary axle of the rotary shaft member 8 serves as the second axle L2. Note that a member of the intermediate unit 2 is attached to the connection member 12 as a cover for the connection member 12.

Also, as illustrated in FIG. 4, both ends of the connection fitting 12 are formed with support pieces 12a extending in a crank-like shape inward from the first piece 12b. Column-like shafts 19 are embedded outwardly from the two support pieces 12a along the central axle of the intermediate unit 2. The respective shafts 19, as illustrated in FIG. 3, penetrate through-holes 1d formed in side walls in the recessed portion 1c of the body unit 1 and are pivotally supported on bearing fittings 25 and fixed inwardly of the body unit 1.

With this construction, the connection member 12 and the intermediate unit 2 rotates about the central axle of the intermediate unit 2. That is, the central axle (a rotary axle of the shafts 19) of the intermediate unit 2 serves as the first axle L1. Note that, as shown in FIG. 3, the first piece 12b of the connection member 12 is located so as to be upright and in front of the recessed portion 1c of the body unit 1, and the second piece 12c of the connection member 12 is located substantially in parallel to the upper surfaces 1a and 1b of the body unit 1 on the bottom side of the recessed portion 1c in a state where the axle of the rotary shaft member 8 is directed substantially perpendicular to the upper surfaces 1a and 1b of the body unit.

Incidentally, a cable 15 through which the display data are transmitted to the liquid crystal display 9 in the display unit 3 and through which the input data from the resistance film screen 7 are transmitted to the body unit 1 extends via within the rotary shaft member 8, runs through a through-hole 8e formed in the bottom surface thereof, and is, after being taken around the shaft protrusion 8a, led into the body unit 1.

Given next is an explanation of a lock mechanism for locking the rotation of the intermediate unit 2 about the first axle L1 with respect to the body unit 1 and the rotation of the display unit 3 about the second axle L2 with respect to the intermediate unit 2.

As illustrated in FIGS. 3 and 4, a bar receiving member 16 bent substantially in a C-shape, as viewed from the display unit 3, is fixed with a screw to the inner surface of the first piece 12b of the connection member 12 in a state where both ends 16a are directed inwardly with respect to the connection member 12. In this screw-fastened state, the two ends 16a, of the bar receiving member 16 are arranged in a side-by-side relationship along the first axle. Then, through-holes for holding a column-like lock bar (a rotation restricting member 17), so that the lock bar is capable of advancing and retreating, are formed in the same positions with the two ends 16a. Accordingly, it follows that the lock bar 17 is held in parallel to the first axle L1. In this lock bar 17, a bar-like operation lever (an operating member) 18 is fixed and directed perpendicularly in a position between the two ends of the bar receiving member 16. The other end of the operation lever 18 penetrates slots (unillustrated) formed in the first piece 12b of the connection member 12 as well as in the bar receiving member 16 and a slot 2b formed in the intermediate unit 2 and is thus exposed to the outside. Accordingly, the lock bar 17 can be so operated as to advance and retreat in the axial directions by use of the operation lever 18. An advancement-and-retreat range of the lock bar 17 is, however, confined to a range where the operation lever 18 is movable between the two ends 16a, 16a of the bar receiving member 16. Then, a position of the lock bar 17 when the operation lever 18 impinges upon the left end 16a in FIGS. 3 and 4 is referred to as a first position and a position of the lock bar 17 when impinging upon the right end 16a is termed referred to as a second position.

Figure 5:
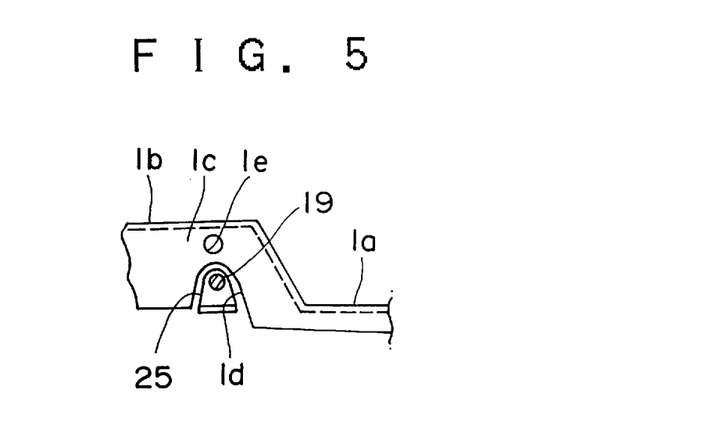
FIG. 5 is a partial sectional view taken along the line IV—IV in FIG. 3.

FIG. 5 is a partial sectional view taken along the line IV—IV in FIGS. 1 and 3 and, as illustrated in FIG. 5, an inner side wall of the recessed portion of the body unit 1 is formed with a lock hole (an engagement recessed portion) 1e into which an outer end 17a of the lock bar 17 existing in the first position is inserted when the display unit 3 becomes substantially perpendicular to the upper surfaces 1a and 1b of the body unit 1. Note that the outer end of 17a of the lock bar 17 disengages from the lock hole 1e when the lock bar 17 is in the second position.

Further, as shown in FIGS. 3 and 4, the rotary shaft member 8 is formed with lock holes (engagement recessed portions) 8b into which an inner end 17b of the lock bar 17 existing in the second position is inserted when the display unit 3 is directed parallel to the first axle 1 (when the surface formed with the display window 3b is directed toward the keyboard 4 and directed on the opposite side). Note that the inner end 17b of the lock bar 17 disengages from the lock holes 8b when the lock bar is in the first position. A total length of the lock bar 17 is, however, substantially the same as a distance from the inner side wall of the recessed portion 1c of the body unit 1 to the rotary shaft member 8. Accordingly, any one of the outer end 17a and the inner end 17b of the lock bar 17 is inserted into the corresponding lock holes 1e and 8b, and the other end comes off the corresponding lock holes 1e and 8b.

Based on the above construction, when the display unit 3 is not substantially perpendicular to the upper surfaces 1a and 1b of the body unit 1, the outer end 17a of the lock bar 17 is not insertable into the lock hole 1e on the side of the body unit 1 and the lock bar 17 can take nothing but the second position. Accordingly, at this time, the display unit 3 must be directed in parallel to the first axle L1 and the inner end 17b of the lock bar 17 must be inserted into the lock hole 8b on the side of the rotary shaft member 8 As a result, the connection member 12 (the intermediate unit 2) is rotatable about the first axle with respect to the body unit 1, and the display unit 3 is openable and closable between the position for covering the keyboard 4 and the normal using position. On the other hand, the display unit 3 is unable to rotate about the second axle with respect to the connection member 12 (the intermediate unit 2). Hence, the display window 3b is fixed in the direction toward the keyboard 4 or in the direction opposite thereto.

The connection member 12 (the intermediate unit 2) is rotated as it remains in this state, and the display unit 3 is thereby set in a rotational position (a first angular position) in which the display unit 3 is directed perpendicular to the upper surfaces 1a and 1b of the body unit 1. Hereupon, the lock hole 1e of the body unit 1 is located on the line of extension of the lock bar 17. Accordingly, in this state, the operation lever 18 is operated from outside of the intermediate unit 2, and the lock bar 17 can be thereby be shifted to the first position from the second position. Thus, the lock bar 17 is shifted to the second position, at which time the inner end 17b disengages from the lock hole 8b of the rotary shaft member 8, and the outer end 17a is inserted into the lock hole 1e of the body unit 1. As a result, the connection member 12 (the intermediate unit 2) is unable to rotate about the first axle with respect to the body unit 1, and the display unit 3 cannot be opened or closed. On the other hand, the display unit 3 is rotatable about the second axle with respect to the connection member 12 (the intermediate unit 2) and the display window 3b can be directed toward the keyboard 4 or turned over.

Figure 6:
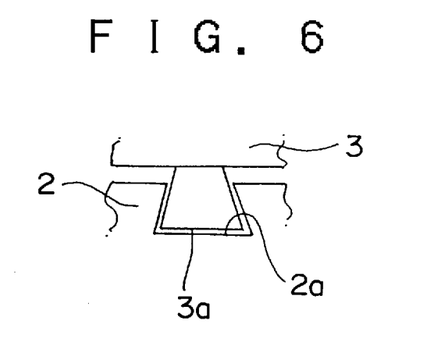
FIG. 6 is an partial enlarged view in FIG. 1.

Next, there will be explained a support mechanism for holding the display unit 3 in the intermediate unit 2 in the normal using state. As discussed above, the display unit 3 is connected to the intermediate unit 2 (the connection member 12) through only the rotary shaft member 8. Hence, there must be a possibility in which a sufficient strength of holding the display unit 3 is not secured in the normal using state wherein the display unit 3 is parallelled to the first axle L1 and directed perpendicularly to the upper surfaces 1a and 1b of the body unit 1. Therefore, in accordance with this embodiment, as shown in FIG. 6, engagement protrusions 3a take a trapezoidal shape in front and are protruded on both sides of the rotary shaft member 8 at the lower end surface of the display unit 3. On the other hand, dovetail grooves 2a engage with the engagement protrusions 3a when the whole display unit 3 is paralleled with the first axle L1 and are formed in the intermediate unit 2.

With this construction, the engagement protrusions 3a of the display unit 3 engage with the dovetail grooves 2a of the intermediate unit 2 during states (the normal using state, the housing state where the display unit 3 is closed with the display window 3b directed toward the keyboard 4, and the handwriting input state in which the display unit 3 is closed with the display window 3b directed opposite to the keyboard 4) other than a duration of rotation of the display unit 3 about the second axle L2. Accordingly, in the normal using state, a weight of the display unit 3 is sustained by the engagement of the engagement protrusions 3a with the dovetail grooves 2a in addition to the rotary shaft member 8. As a result, the necessary strength to hold the display unit 3 can be sufficiently secured.

Next, the operation of the information processor as a personal computer will be explained. With the display unit 3 in the housing state, the display unit 3 is closed with the display window 3b directed toward the keyboard 4.

A changeover from this state to the normal using state where the input operation is executed by use of the keyboard 4 involves rotating the intermediate unit 2 toward the distal side about the first axle L1 and thus opening the display unit 3 until the display unit 3 is perpendicular to the upper surfaces 1a and 1b of the body unit 1.

Figure 7:
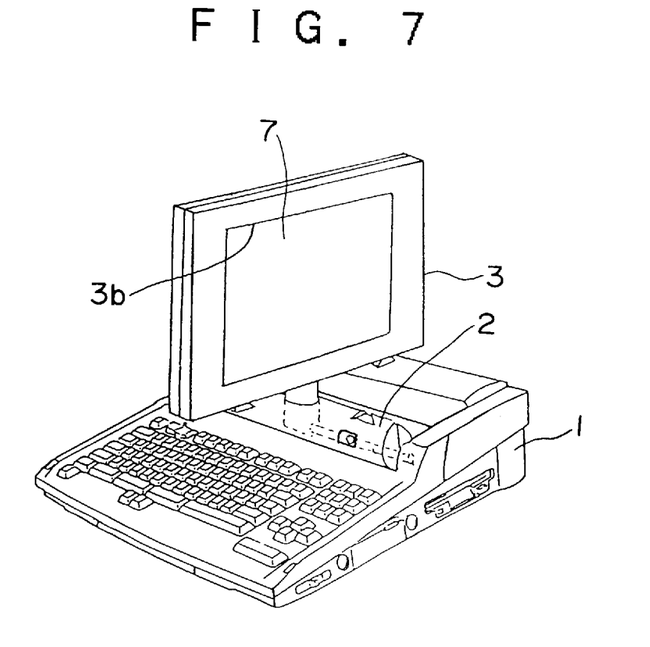
FIG. 7 is a perspective view showing a state of how a display unit is rotated.

Next, when performing only the handwriting input operation by use of the resistance film screen 7 in this state, the lock bar 17 is shifted from the second position to the first position by operating the operation lever 18. The inner end 17b of the lock bar 17 then comes off the lock hole 8b of the rotary shaft member 8 and the outer end 17a is inserted into the lock hole 1e of the body unit 1. Then, the intermediate unit 2 is unable to rotate about the first axle L1, whereas the display unit 3 is rotatable about the second axle L2. Then, the engagement protrusions 3a of the display unit 3 are disengaged from the dovetail grooves 2a of the intermediate unit 2, thus rotating the display unit 3 through 180 degrees about the second axle L2. FIG. 7 illustrates a state of the display unit 3 during the rotation thereof.

Figure 8:
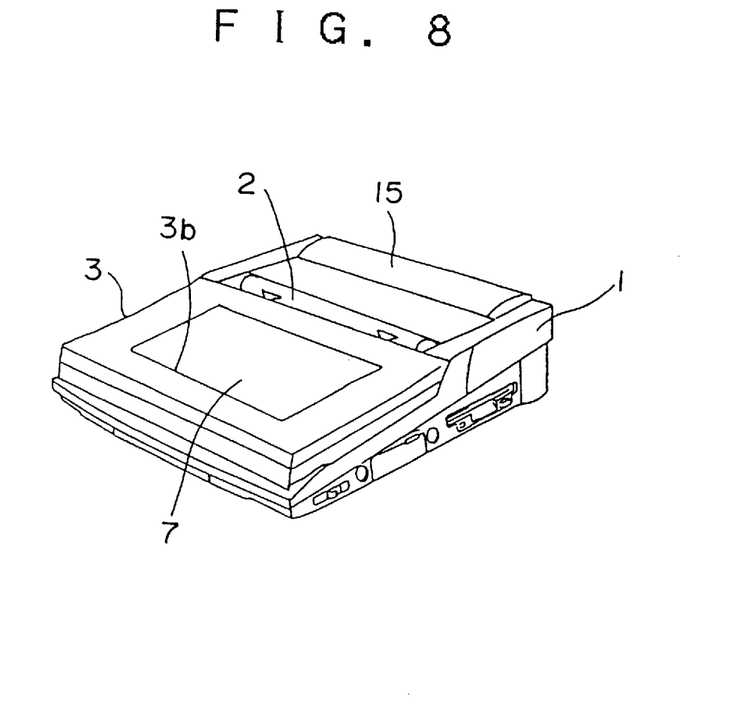
FIG. 8 is a perspective view showing a state of a handwriting input.

When rotated through 180 degrees in this way, the display window 3b of the display unit 3 is directed opposite to the keyboard 4 and the engagement protrusions 3a of the display unit 3 reengage with the dovetail grooves 2a of the intermediate unit 2. In this state, the operation lever 18 is again operated, thereby shifting the lock bar 17 from the second position to the first position. The outer end 17a of the lock bar 17 is then removed from the lock hole 1e of the body unit 1 and the inner end 17b is inserted into the lock hole 8 of the rotary shaft member 8. Then, the display unit 3 becomes unable to rotate about the second axle L2, while the intermediate unit 2 is rotatable about the first axle L1. Subsequently, the intermediate unit 2 is rotated toward the proximal side about the first axle L1, thus closing the display unit 3. Then, as depicted in FIG. 8, in the handwriting input state, the display window 3b of the display unit 3 appears outside.

The operator traces on the resistance film screen 7 with an unillustrated pen in this state and thus inputs a handwritten character or image. In this case, the resistance film screen 7 is located in front of the operator, and hence the handwriting is easy to input and since the display unit 3 rear side is contiguous to the upper surface 1a, the personal computer never falls down when in this state. Further, the handwriting can be inputted while viewing the result at the printer.

When it is desired to close the display window 3b of the display unit 3 after finishing the handwriting input, in a sequence reversed to the above-mentioned, the display unit 3 is directed substantially perpendicular to the upper surfaces 1a and 1b of the body unit 1 and after operating the operation lever 18, the display unit 3 is rotated through minus 180 degrees about the second axle L2 and closed subsequent to a re-operation of the operation lever 18. The display unit 3 of the personal computer thereby reverts to the previous housing position.

An embodiment of the present invention is, as compared to the first embodiment discussed above, characterized by deflecting the axial directions of the outer end 21a and of the inner end 21b of the lock bar 21 so as to be orthogonal to each other and is, in this respect only, different in terms of the construction of the first embodiment. Accordingly, the same configurations as those in the first embodiment are omitted in their explanations by marking the components with the like reference numerals in the accompanying drawings.

A lock mechanism in the second embodiment will be described.

Figure 9:
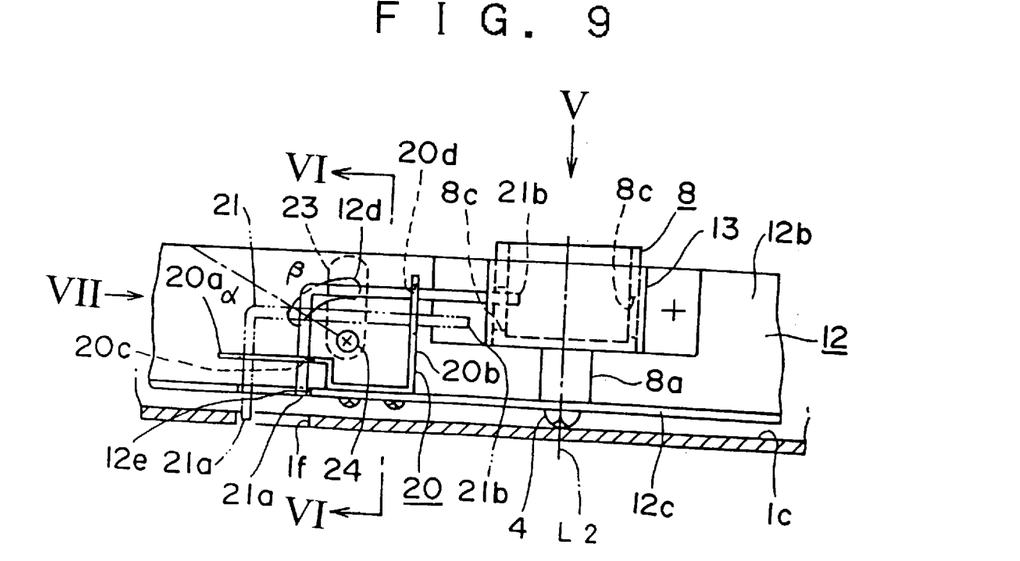
FIG. 9 is a partial enlarged vertical sectional view taken along the line II—II in FIG. 1 in a second embodiment of the present invention.
Figure 10:
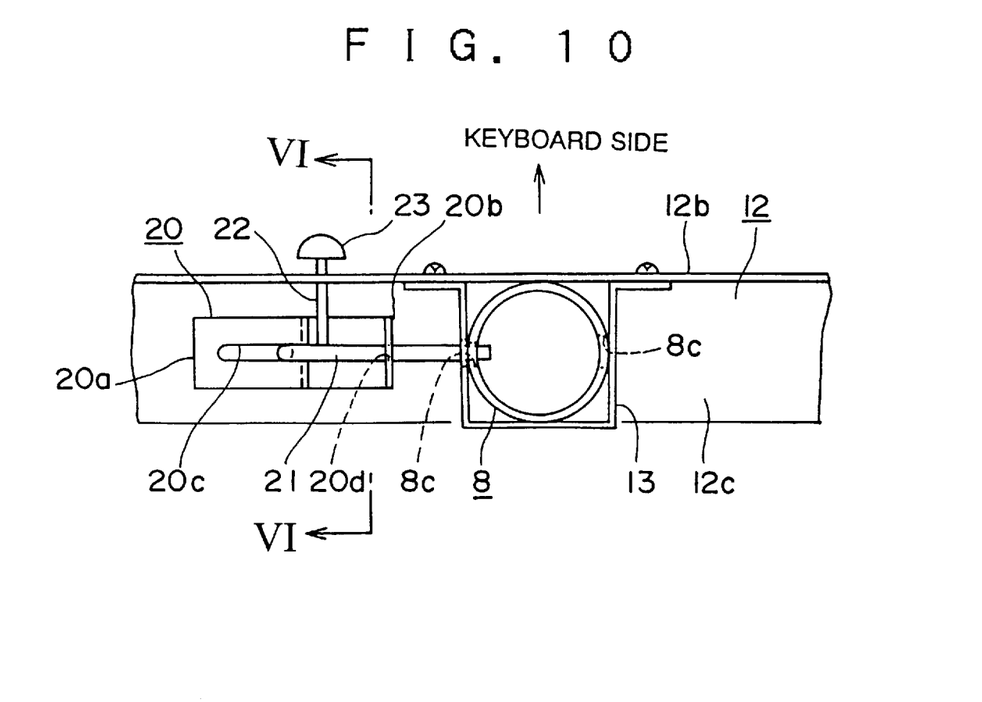
FIG. 10 is a view showing parts as viewed in an arrowed direction V in FIG. 9.
Figure 11:
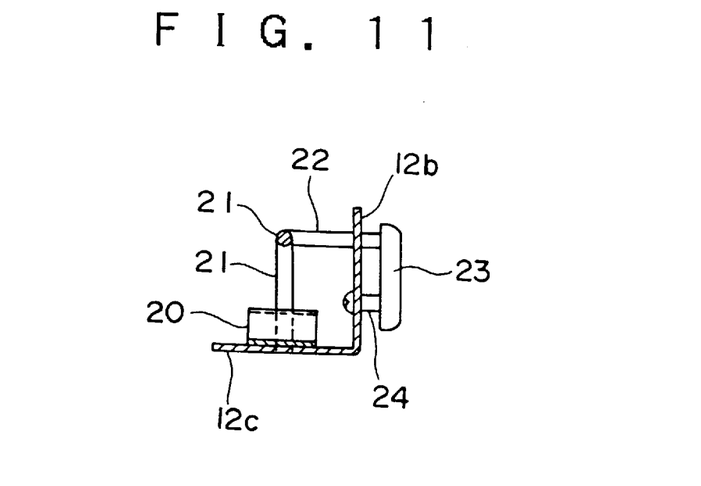
FIG. 11 is a vertical sectional view taken along the line VI—VI in FIGS. 9 and 10.
Figure 12:
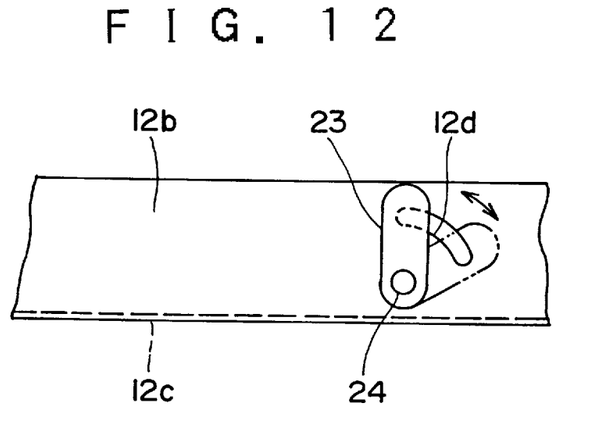
FIG. 12 is a view showing parts as viewed from the rear side in FIG. 9.
Figure 13:
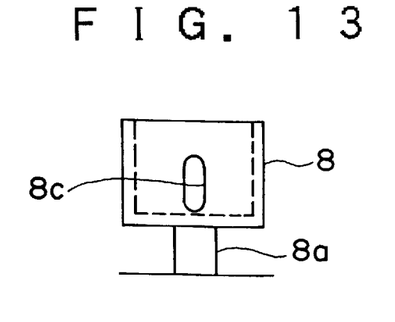
FIG. 13 is a side view of a rotary shaft member as viewed in an arrowed direction VII in FIG. 9.

FIG. 9 is a view illustrating components corresponding to those in FIG. 3 in accordance with the first embodiment. FIG. 10 is a view showing the parts as viewed in an arrowed direction V in FIG. 9. FIG. 11 is a sectional view taken along the line VI—VI in FIGS. 9 and 10. FIG. 12 is a view showing the parts as viewed from the rear side (on the side of the keyboard 4) in FIG. 9. FIG. 13 is a side view of the rotary shaft member 8 as viewed in an arrowed direction VII in FIG. 9.

Screw-fixed to the inner surface of the second piece 12c of the connection member 12, as depicted in FIGS. 9 and 10, is a bar receiving member 20 including a first end 20a erected with respect to the first piece 12b and paralleled to the second piece 12c, and a second end 20b erected with respect to the first and second pieces 12 and 12c. The first end 20a of this bar receiving member 20 is formed with a first slot 20c, holed in parallel to the first axle L1, and the second end 20b thereof is formed with a second slot 20d, holed in parallel to the second axle L2.

The lock bar (the rotation restricting member) 21 crooked in an L-shape in the middle portion has its outer end 21a penetrating the first slot 20c so as to be orthogonal to the first end 20a of the bar receiving member 20, and an inner end 21b penetrating the second slot 20d so as to be orthogonal to the second end 20b of the bar receiving member 20.

Fixed to this lock bar 21 is a connection pin 22 penetrating a circular-arc through-groove 12d grooved in the first piece 12b of the connection member 12. The other end of the connection pin 22 is rotatably pivotally secured to one end of a manipulation knob 23 protruded outside via a slot 2d formed in the intermediate unit 2. The other end of the manipulation knob 23 is, as shown in FIGS. 11 and 12, is pivotally secured to the first piece 12b of the connection member 12 so as to be rotatable about a rotary axle 24 embedded in the principal position of the circular-arc through-groove 12d. Accordingly, the lock bar 21 can be moved between a first position (α) and a second position (β) shown in FIG. 9 by rotating the manipulation knob 23 from outside of the intermediate unit 2. Incidentally, the first slot 20c and the second slot 20d that are formed in the bar receiving member 20 are shaped so that the outer and inner ends 21a and 21b of the lock bar 21 impinge upon edges of the first slot 20c and the second slot 20d in the first and second positions (α) and (β), with the result that the outer end 21a is directed in parallel to the second axle L2 and the inner end 21b is directed in parallel to the first axle L1.

On the other hand, as illustrated in FIG. 9, a bottom wall within the recessed portion 1c of the body unit 1 is formed with an elongated lock groove (an engagement recessed portion) 1f into which the outer end 21a of the lock bar 21 existing in the fist position is inserted when the display unit 3 is substantially perpendicular to the upper surfaces 1a and 1b of the body unit 1. Note that, the outer end 21a of the lock bar 21a comes off the lock groove if when the lock bar 21 is in the second position.

Further, as shown in FIG. 13, the rotary shaft member 8 is formed with elongated lock grooves (engagement recessed portions) 8c into which the inner end 21b of the lock bar 21 located in the second position is inserted when the display unit 3 is directed in parallel to the first axle L1 (when the surface formed with the display window 3b is directed toward the keyboard 4, and when directed on the opposite side). Note that the inner end 21b of the lock bar 21 disengages from the lock grooves 8c when the lock bar 21 is located in the first position. However, a total length of the outer and inner ends 21a and 21b of the lock bar 21 is adjusted so that any one of the ends is inserted into the corresponding lock grooves 1f and 8c, while the other end comes off the lock grooves 1f and 8c. With the construction given above, when the display unit 3 is not substantially perpendicular to the upper surfaces 1a and 1b of the body unit 1, the outer end 21a of the lock bar 21 is not insertable into the lock groove if of the body unit 1, and therefore, the lock bar 21 can only be in the second position. Accordingly, at this time, the display unit 3 is in such a state as to be directed in parallel to the first axle L1 and the inner end 21b of the lock bar 21 must be inserted into the lock groove 8c of the rotary shaft member 8. As a result, the connection member 12 (the intermediate unit 2) becomes rotatable about the first axle with respect to the body unit 1, whereby the display unit 3 can be opened and closed between the position for covering the keyboard 4 and the normal using position. On the other hand, the display unit 3 is unable to rotate about the second axle with respect to the connection member 12 (the intermediate unit 2). Therefore, the display unit 3 is fixed so that the display window 3b is directed toward the keyboard 4 or directed opposite thereto.

When the connection member 12 (the intermediate unit 2) is rotated as it remains in this state, and the display unit 3 is thereby set in the rotational position (the first angular position) in which the display unit 3 is directed perpendicular to the upper surfaces 1a and 1b of the body unit 1. Hereupon, the lock groove 1f of the body unit 1 is located on the line of extension of the lock bar 21. Accordingly, in this state, the manipulation knob 23 is rotationally manipulated from outside of the intermediate unit 2, whereby the lock bar 21 can be shifted from the second position to the first position. When the lock bar 21 is thus shifted to the second position, the inner end 21b thereof comes off the lock groove 8c of the rotary shaft member 8, and the outer end 21a thereof is inserted into the lock groove 1f of the body unit 1. As a result, the connection member 12 (the intermediate unit 2) is incapable of rotating about the first axle with respect to the body unit 1, and consequently the display unit 3 is unable to open and close. On the other hand, the display unit 3 gets rotatable about the second axle with respect to the connection member 12 (the intermediate unit 2) and the display window 3b can be directed toward the keyboard 4 or turned over.

Other operations in the second embodiment are the same as those in the first embodiment, and therefore the explanations thereof are omitted.

It is apparent that, in this invention, a wide range of different working modes can be formed without deviating from the spirit and scope of the invention. This invention is not restricted by its specific working modes except being limited by the appended claims.

What is claimed is:

1. An information processor for displaying a result of information processing on a display panel, comprising:

a body unit having an upper surface;

a connection unit connected to said body unit, and rotatable with respect to said body unit about a first axis substantially parallel to the upper surface of said body unit;

a display panel holding unit connected to said connection unit, and rotable with respect to said connection unit about a second axis orthogonal to the first axis, said display panel holding unit holding said display panel parallel with the second axis; and a rotation restricting member to restrict a rotation of said connection unit with respect to said body unit only when existing in a first angular position in which said display panel holding unit is substantially upright on the upper surface of said body unit, said rotation restricting member releasing the rotational restriction of said display panel holding unit with respect to said connection unit, and, when said display panel holding unit is in a second angular position exclusive of the first angular position, releasing the rotational restriction of said connection unit with respect to said body unit while restricting the rotation of said display panel holding unit with respect to said connection unit;

wherein said rotation restricting member is provided within said connection unit, movable between a first position locatable only when said display panel holding unit is in the first angular position with respect to the upper surface of said body unit and a second position locatable irrespective of the angular position of said display panel holding unit with respect to the upper surface of said body unit, and, when in the first position, engaging with said body unit and disengaging from said display panel holding unit, and, when in the second position, engaging with said display panel holding unit and disengaging from said body unit.

2. An information processor according to claim 1, wherein said rotation restricting member includes an operating portion operable from outside of said connection unit.

3. An information processor according to claim 1, wherein:

said rotation restricting member comprises a first end having a first bar-like end part and a second end having a second bar-like end part;

said body unit is formed with an engagement recessed portion engaging with one of said first or second end part of said rotation restricting member only when said rotation restricting member is in the first position; and said display panel holding unit is formed with an engagement recessed portion engaging with the other one of said first or second end part of said rotation restricting member only when said rotation restricting member is in the second position.

4. An information processor according to claim 3, wherein said first bar-like end part and said second bar-like end part of said rotation restricting member are coaxial.

5. An information processor according to claim 3, wherein axial directions of said first bar-like end part and said second bar-like end part of said rotation restricting member are orthogonal to each other.

* * * * *

UNITED STATES PATENT AND TRADEMARK OFFICE
CERTIFICATE OF CORRECTION

PATENT NO.   : 5,873,554
DATED        : February 23, 1999
INVENTOR(S)  : Nobuchi It is certified that error appears in the above-identified patent and that said Letters Patent is hereby corrected as shown below:

Title Page

[56] FOREIGN PATENT DOCUMENTS, insert following reference:
      -- 4-188213      7/1992     Japan--.

Col. 3,   line 3, delete "leastwise".
Col. 5,   line 27, "III" should be --I-I--;
          line 49, "A" should be --III--.
Col. 6,   line 26, "rotates" should be --rotate--.

Col. 7,   line 13, delete "termed";
          line 38, delete ",";
          line 48, "8" should be --8.--.

Col. 8,   line 3, delete ",".

Col. 10,  lines 30, 34 and 53, "if" should be --1f--.

Col. 12,  lines 40 and 43, "3" should be --4--.

Signed and Sealed this

Twenty-fourth Day of August, 1999

Attest:

Q. TODD DICKINSON

*Attesting Officer*      *Acting Commissioner of Patents and Trademarks*